US008265870B1

(12) United States Patent
Nguyen et al.

(10) Patent No.: US 8,265,870 B1
(45) Date of Patent: Sep. 11, 2012

(54) REAL-TIME METHOD FOR ESTABLISHING A DETECTION MAP FOR A NETWORK OF SENSORS

(75) Inventors: Hung D. Nguyen, Albuquerque, NM (US); Mark W. Koch, Albuquerque, NM (US); Casey Giron, Albuquerque, NM (US); Daniel M. Rondeau, Albuquerque, NM (US); John L. Russell, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 477 days.

(21) Appl. No.: 12/690,630

(22) Filed: Jan. 20, 2010

(51) Int. Cl.
*G01C 21/00* (2006.01)
(52) U.S. Cl. .................................. 701/450
(58) Field of Classification Search ............. 701/450
See application file for complete search history.

(56) References Cited

U.S. PATENT DOCUMENTS

| | | | |
|---|---|---|---|
| 6,885,303 B2 | 4/2005 | Payton et al. | |
| 7,012,520 B2 | 3/2006 | Web, Sr. | |
| 7,515,104 B2 | 4/2009 | Ray et al. | |
| 7,522,043 B2 | 4/2009 | English et al. | |
| 2005/0187678 A1* | 8/2005 | Myeong et al. | 701/27 |
| 2006/0015215 A1* | 1/2006 | Howard et al. | 700/245 |
| 2006/0046664 A1 | 3/2006 | Paradiso et al. | |
| 2008/0076450 A1 | 3/2008 | Nanda et al. | |
| 2009/0196206 A1* | 8/2009 | Weaver et al. | 370/310 |
| 2010/0100325 A1* | 4/2010 | Lovell et al. | 701/301 |
| 2010/0138094 A1* | 6/2010 | Stark et al. | 701/23 |
| 2010/0274487 A1* | 10/2010 | Neff et al. | 701/302 |
| 2011/0010033 A1* | 1/2011 | Asahara et al. | 701/26 |

* cited by examiner

*Primary Examiner* — Hussein A. Elchanti
(74) *Attorney, Agent, or Firm* — Carol I. Ashby

(57) ABSTRACT

A method for establishing a detection map of a dynamically configurable sensor network. This method determines an appropriate set of locations for a plurality of sensor units of a sensor network and establishes a detection map for the network of sensors while the network is being set up; the detection map includes the effects of the local terrain and individual sensor performance. Sensor performance is characterized during the placement of the sensor units, which enables dynamic adjustment or reconfiguration of the placement of individual elements of the sensor network during network set-up to accommodate variations in local terrain and individual sensor performance. The reconfiguration of the network during initial set-up to accommodate deviations from idealized individual sensor detection zones improves the effectiveness of the sensor network in detecting activities at a detection perimeter and can provide the desired sensor coverage of an area while minimizing unintentional gaps in coverage.

20 Claims, 13 Drawing Sheets

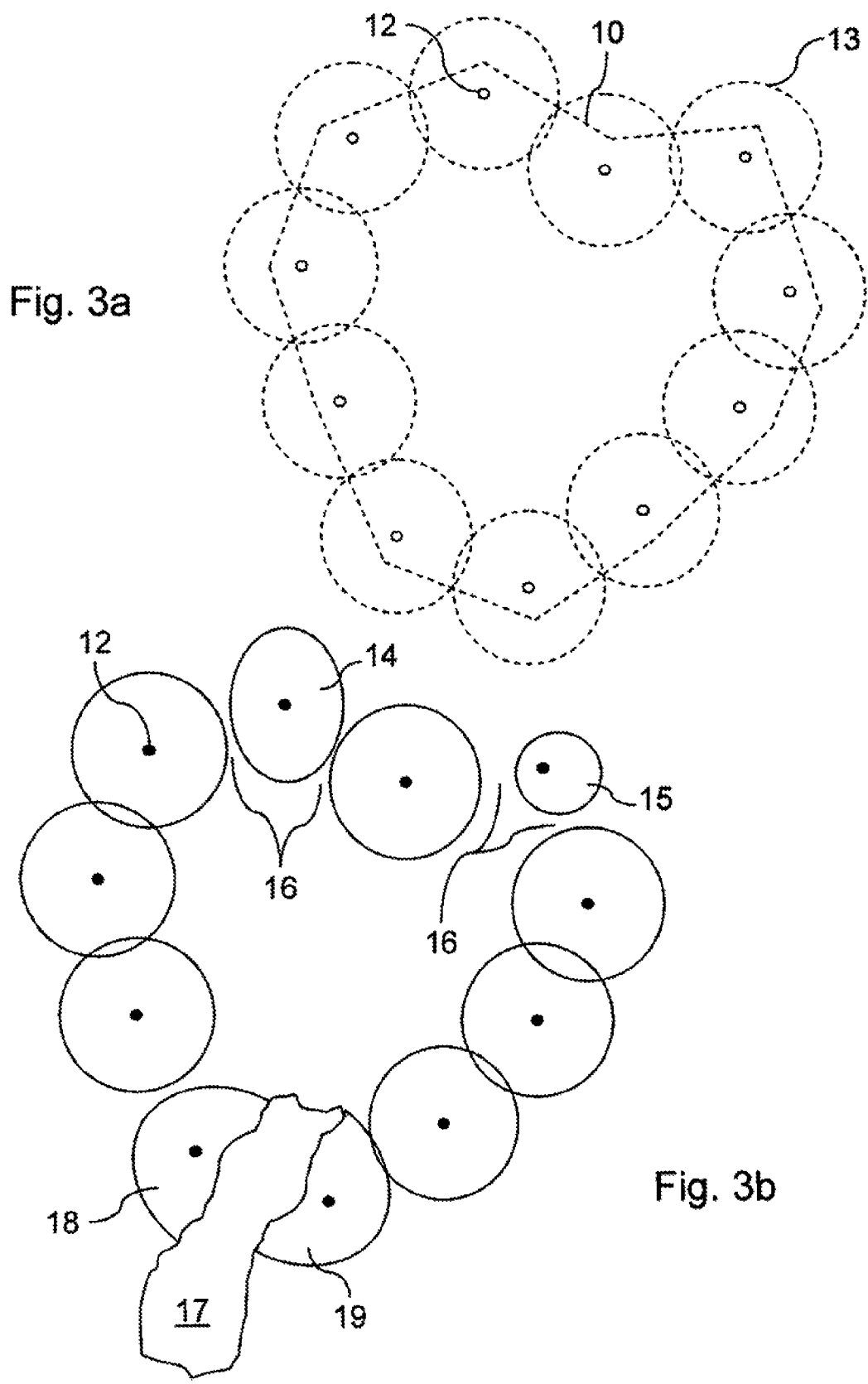

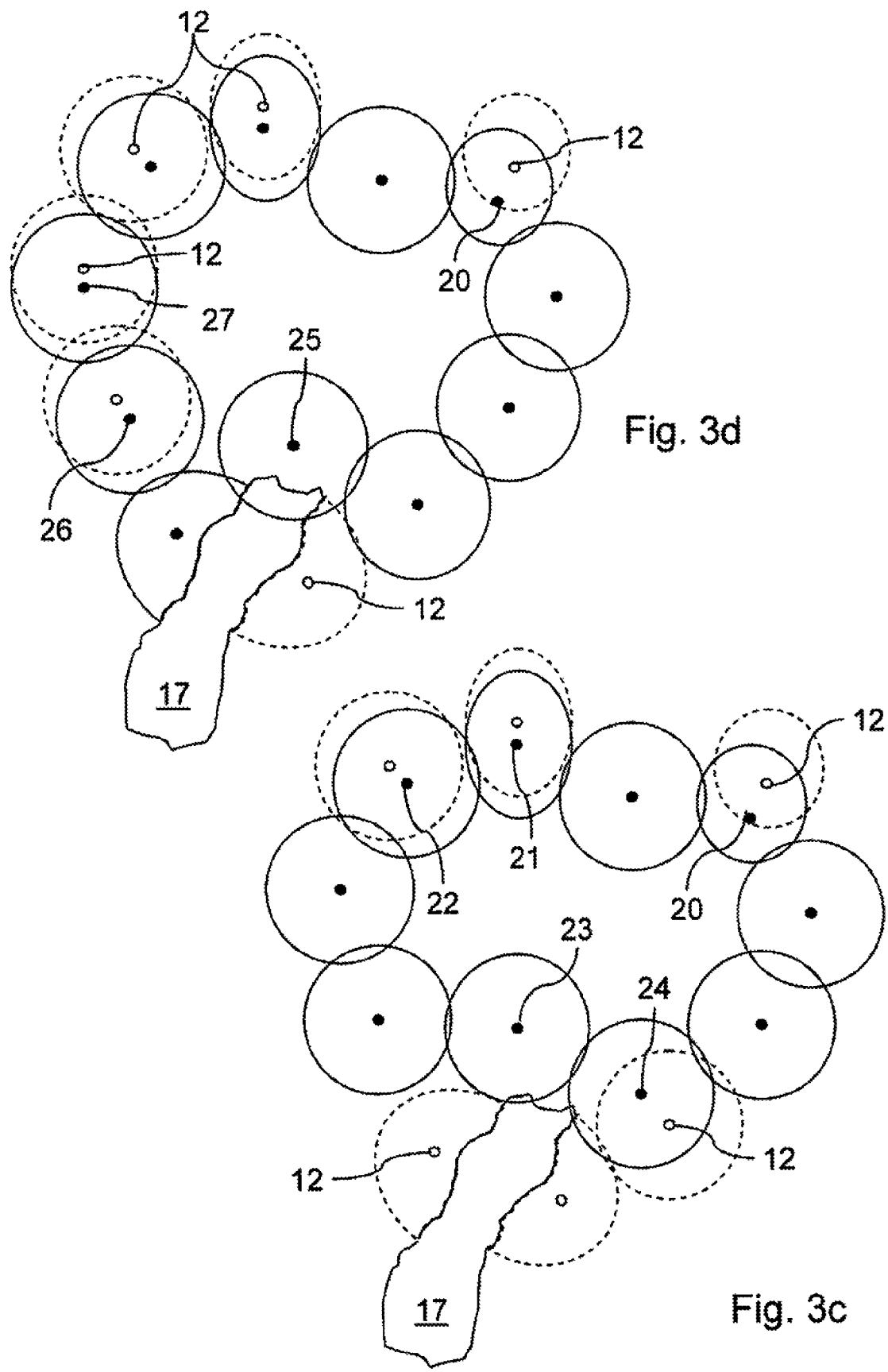

REAL-TIME METHOD FOR ESTABLISHING A DETECTION MAP FOR A NETWORK OF SENSORS

The United States Government has rights in this invention pursuant to Department of Energy Contract No. DE-AC04-94AL85000 with Sandia Corporation.

BACKGROUND OF THE INVENTION

This invention relates to a method of establishing a detection map for a network of sensors. When designing a network of sensors to establish an area of detection with a corresponding detection map, it is common to lay out an initial pattern of sensors that employs the theoretically expected detection capability of the sensor network based upon the expected detection zones of the individual sensors and then selects initial locations for the individual sensors such that their expected detection zones overlap in such a way as to provide an expected detection map corresponding to a detection perimeter. However, in real-world applications, the actual detection zone of a sensor can be significantly altered by the terrain in which it is placed. Numerous factors are included in the concept of terrain for the purposes of this invention. These include but are not restricted to man-made structures, topography, flora, ground composition including characteristics such as soil type, degree of compaction, ground moisture, and lithic components, and other factors that might alter the value of a measured parameter for a particular sensor. For example, for seismic sensors, the ground composition such as the type of soil, the degree of compaction, the presence of buried rocks, and even the moisture content of the ground can affect the sensor range and sensitivity. The presence of trenches or drop-offs can also change the sensor range. For another example, the wind level or the presence of intervening objects such as plants, rocks, and man-made structures can affect the range and sensitivity of acoustic sensors. For another example, an optical sensor may have an obstructed line of sight or the local topography may include inclines that alter the pointing angle of the sensor.

In addition, it may not be possible to place the sensor on the initially selected location due to the presence of interfering objects, such as plants, boulders, trenches, drop-offs, water features, man-made structures, and numerous other aspects of the real terrain that inhibit placement of the sensor in a previously selected location. The forced relocation of the sensor to accommodate the terrain may result in a degradation of the quality of overlap of the detection zones of the various sensor units comprising the sensor network and result in failure to establish an effective detection perimeter. In such cases, the expected detection map and the actual detection map can differ, markedly, leading one to assume an adequate detection perimeter has been established when, in reality, it has not.

Thus, there is a need for a method to establish the actual detection map of a real network of sensors that takes into account the actual detection zone of each sensor in the actual location where it has been placed. It is also desirable to know in real-time while the sensor network is being laid out whether the network of sensors is providing the desired overlap of detection zones to produce the desired detection map and to identify alternative locations for the sensor units when the initial pattern of sensors does not provide the desired level of coverage.

BRIEF DESCRIPTION OF THE DRAWINGS

The accompanying drawings, which are incorporated in and form part of the specification, illustrate some embodiments of the present invention and, together with the description, serve to explain the principles of the invention.

FIG. 3 illustrates 3a) an initial placement map with expected detection zones; 3b) a detection map with the measured detection zones for sensor units placed at the initial placement sites showing discontinuities in the detection perimeter; 3c and 3d) a detection map with modified sensor unit positions that produce a continuous detection perimeter; initial placement sites are represented for comparison as open circles.

DETAILED DESCRIPTION OF THE INVENTION

This invention comprises a method for determining an appropriate set of locations for a plurality of sensor units that form a network of sensors and for establishing a detection map for the network of sensors where the detection map includes the effects of the local terrain. This process of establishing the detection map of a network of sensors includes determination of sensor performance during the placement of the sensor units and enables dynamic adjustment or reconfiguration of the placement of the individual elements of the sensor network during network set-up to accommodate variations in local terrain. The reconfiguration of the network during initial set-up to accommodate deviations from idealized individual sensor detection zones can improve the effectiveness of the sensor network in detecting activities and moving objects at or near the detection perimeter and can help achieve the desired sensor coverage of an area while minimizing unintentional gaps in coverage.

Figure 1:
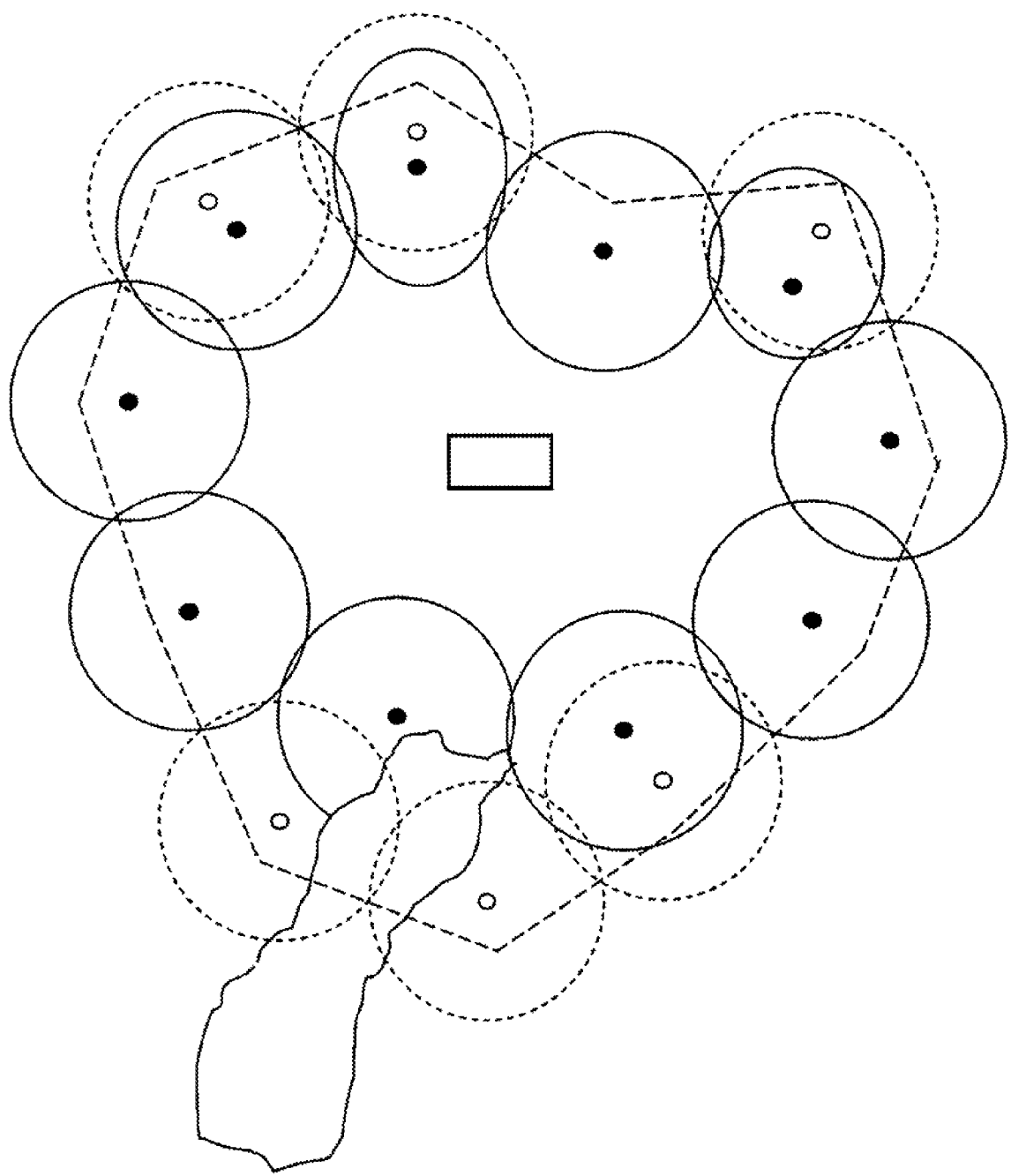
FIG. 1 illustrates an initial placement map for a network of sensors for establishing a detection perimeter that was based upon the expected detection zone (dashed circles around open circles corresponding to initial placement sites) for each sensor. This is overlain with a detection map based on the actual sensor placement sites (solid circles) with corresponding measured detection zones (solid lines) that will provide an effective detection perimeter around the box in located within the detection perimeter.

When establishing a network of sensors, it is often desirable to place the sensor units such that their overlapping fields of detection or detection zones establish a substantially continuous coverage of a selected region or a substantially continuous perimeter around at least a portion of a selected region. One example is the placement of a number of sensor units such that their overlapping sensing fields establish a virtual perimeter around a defined zone. This is illustrated in FIG. 1, where an initial placement map for a network of sensors (open small circles) for establishing a detection perimeter (dashed line) that was based upon the expected detection zone (dotted lines) of each sensor is overlaid with a detection map based on the actual sensor placement sites (filled small circles) with corresponding measured detection zones (solid lines) that will provide an effective detection perimeter. As will be discussed in detail below, variations in the placement of sensor units can be driven by deviations in a sensor unit's detection zone from its expected configuration or by the presence of features in the terrain that inhibit placement of a sensor unit in an originally selected site. In various embodiments of this invention, the suitability of a particular sensor unit placement site is determined in real-time by establishing the detection map as the sensor network is being laid out, enabling relocation of a sensor unit to a more suitable location during initial network construction and thereby avoiding unintended and often unanticipated openings in a detection perimeter. When appropriate, appropriate alternate placement sites for as-yet unplaced sensor units can be calculated to accommodate the actual sensor placement sites of already-placed sensor units of the network.

Each sensor unit has the ability to detect and optionally classify an entity that enters its detection zone, that is, an entity which approaches within its individual detection range. By using a network of sensor units, it is possible to establish a detection perimeter with each sensor unit being responsible for monitoring a section of the detection perimeter. By placing each sensor unit so that its detection zone overlaps at least a portion of the detection zone of one or more adjacent sensor units, the combined detection range of the network can provide coverage of the selected region. By determining during the network construction the portions of the detection zone of a sensor unit involved in establishing the detection perimeter, the detection map formed from a combination of the detection zones includes information about the location of vulnerabilities that may exist due to openings in the detection perimeter and allows adjustment of sensor unit locations to acceptably minimize these vulnerabilities.

While it is a straightforward matter to lay out a hypothetical network of sensors, each with an initial placement site, whose detection zones provide sufficient overlap to establish a desired perimeter, in practice the terrain in which the sensors are placed can cause marked changes in the actual detection zones; this can leave unintended and possibly unrecognized gaps in the established perimeter. This invention addresses this problem through the establishment of a dynamically reconfigurable sensor network that can identify and compensate for deficiencies in the initial hypothetical network configuration; this reconfiguration of the network from the initial configuration can be performed in real time during the process of setting up the sensors of the network.

In embodiments of this invention, the detection performance of the sensor network is estimated and/or measured during the network's construction. The position of each sensor unit can be adjusted during placement to accommodate variations in its detection zone due to variations in terrain or variation in its performance while maintaining adequate overlap with the detection zone of a previously placed sensor. When needed, the appropriate placement of sensor units still to be positioned can be recalculated to provide new coordinates for placement of one or more of the remainder of the sensor units to establish the desired perimeter.

In various embodiments, the sensor network comprises a base unit and a plurality of sensor units in communication with the base unit, either directly or indirectly through communication with a nearby sensor unit. The base unit can be a separate unit or can be integrated as part of one of the sensor units. The base unit can be located at a substantially fixed position within or proximate to the detection zone, or it can be a mobile base unit. For convenience, the base unit may be located adjacent to an object or location within the detection perimeter that one may wish to protect. However, the base unit may also be located remotely from the detection perimeter, such as, for example, at a centralized monitoring location. The base unit can be mobile. One example of a mobile base unit is the situation where the base unit is carried by a mobile deployment unit (MDU) which is employed to place the sensor units at or near the placement sites of the sensor units. The MDU can be a living being, such as a human or animal, or it can be mechanical unit, such as a robotic device. Another example of a mobile base unit is a base unit mounted on a vehicle.

The base unit comprises a computer for executing a program for incorporating the measured detection zones into the detection map and determining whether an adjustment in the location of one or more sensor units is helpful or needed to establish the desired detection perimeter. The base unit in some embodiments may process the location information and detection signals of a sensor unit for determining the measured detection zone. Alternatively, it may receive the detection zone information from a separate source. In some embodiments, the computer of the base unit may calculate the initial placement map to establish the initial perimeter that one wishes to establish. The sites of the initial placement map can be calculated from an initial perimeter by a software program running on a computer that is part of the base unit; in some embodiments, some number of the initial placement sites can be input to the software by the operator/user rather than be calculated. In some embodiments, the initial sites may be selected independently of the base unit program and the initial placement data may be entered into the program. The base unit program provides the capability of selecting an alternative actual placement site for a sensor unit when the initial placement site for the sensor unit is not an acceptable placement site. A placement site may be unacceptable for a number of reasons, including but not limited to features of the terrain causing variations in the detection zone by affecting sensor sensitivity that impede or prevent forming the desired detection perimeter. A site may also be unacceptable because placement of a sensor at that site may not be possible. For example, the site may be blocked by a water feature, a natural structure such as a trench, boulder, or plant, or a man-made structure. Access to the site might also be prohibited by policy constraints or by adversaries so that the sensor unit may not be placed there.

The base unit additionally includes a means for establishing communication with the sensor units and with the MDU so that it can guide the placement of the sensor units and optionally monitor the sensors after establishment of the network. The communication means can be a wireless system or it can involve direct physical connections. A mixture of wireless and direct connections may exist in a single network.

In various embodiments, the base unit employs software for establishing an initial map for the placement of the sensor units to form an initial perimeter. The initial perimeter can be input by the user/operator. It can also be generated by the computer from an operator-input location of a region within the perimeter that is to be protected by the sensor network. In some embodiments, this region can be smaller than the initial perimeter but is located somewhere within the initial perimeter and which will be located within the final detection perimeter after establishment of the detection map. While an operator is defining the initial perimeter, he or she may or may not have knowledge of specifics of the terrain wherein each sensor unit is to be sited. Each sensor unit is assigned a corresponding hypothetical or expected detection zone; this is an expected detection zone for the sensor unit that does not take into account variations that might obtain in the measured detection zone, which is modified from the hypothetical (expected) detection zone by effects of the actual terrain wherein the sensor unit is situated.

In general, a detection zone is a zone surrounding a sensor unit where the probability of detection (PD) exceeds a selected value. The value of the probability of detection that must be equaled or exceeded for a particular application is termed the critical probability of detection (CPD). For a detection perimeter to be considered continuous, the PD at locations along the detection perimeter must equal or exceed the CPD. In some embodiments, the perimeter need not be continuous. The value of the probability of detection that is acceptable at a particular location may be determined by the operator and may range between zero and 100%. For example, in some embodiments, it may be exceedingly important to detect any penetration of the perimeter, leading to selection of a very high PD. In some embodiments, there may be an opening allowed in the perimeter, such as a gateway for the passage of vehicular or human traffic. In the gateway region, it may not be necessary to have a PD greater than 0% in some embodiments. The shape of a particular detection zone will depend on the spatial characteristics of the particular sensing modality and on changes in those characteristics due to variations in the local terrain surrounding the sensor. Fore example, in some embodiments, the detection zone may be essentially circular when the sensor unit's detection pattern is isotropic. For some sensor modalities or sensor unit constructions, a directional character is inherent in the sensor; appropriately shaped detection zones are defined for inclusion in the detection map. In some embodiments, the detection zone may be truncated in one or more directions by the presence of interfering structures in the terrain, such as, for examples, a body of water, a trench, or a wall. Embodiments of this invention allow for a wide range of detection zone shapes; detection zone shapes can be determined for a specific sensor unit at a specific location by the activities of the mobile deployment unit during network set-up.

In some embodiments, the base unit contains the information that defines the initial placement map that hypothetically should establish the detection perimeter based upon idealized detection zones for the sensor units. The detection map of the network is a composite of the detection zones of the individual sensor units. In some embodiments where the sensor units incorporated multiple sensor modalities, the detection map can comprise a composite of a number of detection maps for the different sensor modalities, as will be discussed below. The mobile deployment unit may transport the base unit with it as it sets up the network of sensor units. Alternatively, the base unit can be located at a site within the detection perimeter or at a site not necessarily directly associated with the detection perimeter and/or the sensor units. Communication between the base unit and the MDU guides the MDU in placing sensor units to form the network.

The following is a description of one embodiment of the invention for establishing a detection map of a dynamically configurable or reconfigurable sensor network. In this embodiment, one defines an initial perimeter around a user-defined zone. The initial perimeter can be a continuous perimeter or it can have one or more predetermined openings in the initial perimeter. Examples of such predetermined openings in the initial perimeter would include but not be restricted to gateways, known walls of natural or man-made structures, bodies of water, and other structures that preclude placement of sensors. The sensor units are to be placed to provide a detection perimeter around the user-defined zone where potentially detectable events at locations near, at, or optionally within the perimeter have a probability of detection (PD) that exceeds a critical detection probability (CPD). The particular shape and width of the detection perimeter can be determined by the specifics of a particular detection requirement.

From the initial perimeter, an initial placement map for a network comprising multiple sensor units is derived. Each sensor unit has an expected detection zone. For substantially nondirectional sensors, the detection zone is theoretically substantially symmetric with the sensor unit located at or near the center of the expected zone. Examples of such types of sensors include but are not restricted to seismic sensors, some ground-based radars, and some acoustic sensors, chemical sensors, and radiation sensors. For directional sensors, the sensor will have a detection field of view aligned in some direction pointing away from the sensor unit location. Examples of directional sensors include optical sensors, some ground-based radars, and some acoustic sensors, chemical sensors, and radiation sensors. Fiber optic cable sensors are among the optical sensors suitable for use in embodiments of this invention; they can serve as directional or nondirectional sensors. The directionally dependent signal generated by the sensor is communicated to the base unit for determination of the effective field of view. For example, the presence of an object that blocks the optical path or a particular sensor will produce a reduction in the lateral extent of the detection zone in the direction of the object for that sensor. In some embodiments, a portion away from the edges of the field of view may be blocked; this can be incorporated into the detection map in the form of a discontinuous detection zone. The expected detected zone corresponds to the region where the detection sensitivity of the sensor device equals or exceeds the critical probability of detection for the particular application of the embodiment.

To establish a detection map of a dynamically configured sensor network, the following steps are employed in various embodiments. The user defines an initial perimeter that should establish a detection perimeter around a user-defined zone or region of interest. An initial placement map comprising a set of initial placement sites for the sensor units is generated from the initial perimeter. The sensor unit is a unit comprising one or more sensor devices and a communication means for communicating with a base unit. A sensor device is a sensor such as an acoustic sensor, a seismic sensor, an optical sensor, or another type of sensor as desired by the user.

In the initial placement map, the initial placements of sensor units are calculated to provide overlap of the expected detection zones of individual sensors placed along the perimeter around the user-defined zone or region of interest. The expected detection zone is the hypothetical detection zone for a sensor unit. A detection zone is a region around a sensor unit where the probability of detection (PD) exceeds a selected value, as determined by the user. This expected detection zone does not have to take into account variation in the zone due to effects of the actual terrain wherein the sensor unit is situated. The expected detection zone can be a region of variable shape defined by the user or can be derived from and can be defined in terms of an expected sensor probability detection function. The expected detection zone includes those points where the value of the sensor probability detection function exceeds a minimum probability of detection as defined for a particular application. Different sensor units in a single network can have the same or different sensor probability detection functions. The combination of the expected detection zones for sensors positioned at the initial set of placement sites should form the desired detection perimeter. The initial placement map is a map of the positions of sensor units calculated to provide overlap of the expected detection zones of individual sensors place along the perimeter around the user-defined zone or region of interest. As the sensor units are placed, the locations of their actual placement sites are communicated to a base unit, and the measured detection zones of at least some of the sensor units are determined. In some situations, it may not be possible to measure the entire detection zone of a sensor unit. In such cases, the measured detection zone may be defined partially by measurements and partially by a shape selected by the operator/user. The initial sites and expected detection zones are replaced in the detection map with actual placement sites and their associated measured detection zones.

If an insufficient overlap of the measured detection zones for adjacent placement sites occurs, a modified placement map can be generated to improve overlap. This map comprises the actual placement sites of already-positioned sensor units and unoccupied initial placement sites proximate to which sensor units have not yet been placed. If the combination of measured detection zones and expected detection zones for sensors at the unoccupied initial placement sites (which have not been replaced by actual placement sites) do not complete a desired segment of the detection perimeter, a recalculation of suggested sensor unit positions is performed to generate a modified placement map comprising a placement map of sensors modified from the initial placement map to include placement sites of already-placed sensor units and a set of initial placement sites proximate to which sensor units have not yet been placed. Some of the set of initial placement sites may have locations that have been shifted from their original locations to obtain better expected overlap of detection zones. In some embodiments, the replacement map may suggest repositioning one or more already-positioned sensor units to facilitate formation of the desired detection perimeter. An acceptable placement site is one that is sufficiently close to the initial perimeter to be a reasonable replacement for the corresponding initial placement site in the detection map and that is not located in a region where sensors are not allowed to be placed. Some placement sites may be suitable for forming a detection perimeter but might lie in areas where sensors are not allowed for physical or policy reasons.

In some embodiments, the detection perimeter may not be continuous. This may be desired in applications where an opening such as a gate may be part of the perimeter. In some embodiments, the terrain of the sensor network may make it difficult or impossible to position enough sensor units in locations that can provide a continuous detection perimeter. Such vulnerabilities can be identified in the detection map and mitigated to the extent possible by selecting actual placement sites that minimize regions with inadequate probabilities of detection.

The mobile deployment unit (MDU) transports the sensor units to their assigned locations. This can be a living being, such as a human, or a robotic device. The MDU is responsible for positioning a sensor unit at or proximate to a placement site defined in the placement map (initial or replacement). The MDU is equipped with a location-identification means that can determine a location in a manner that allows for incorporating the location into the detection map. A convenient means for identifying a location employs a global navigation satellite system (GNSS) for providing autonomous geospatial positioning information. One example of a GNSS is the Global Positioning Satellite (GPS) system. In some embodiments, GPS data is employed to indicate the geographic location of the various elements such as the sensor units and the MDU as he/she moves in the vicinity of a sensor unit to establish the measured detection zone. Differential GPS is one type of GNSS that provides location information with a sufficiently high degree of resolution that is suitable for embodiments of this invention. The following discussion refers to a differential GPS (DGPS) location-identification means, but other location-identification means can also be employed in embodiments of this invention. Examples include non-satellite-based systems employing triangulation to determine the relative positions of sensor units by measuring distances and optionally angles between the sensor units and/or the MDU and reference locations. Some examples include methods that employ RF ID tags, acoustic time-of-flight, and radio RF methods.

In some embodiments, the MDU employs a suitably adapted laptop computer for determining locations and communicating between elements of the network, such as, for example, sensor units and a base unit, which may be the computer being carried by the MDU or may be in a different location from the MDU. The following discussion is presented in terms of a general laptop computer, but a dedicated electronic communication and optionally computing device can also be used for conveying location information and communicating between the MDU, the base unit (if not with the MDU), and optionally the sensor units being positioned, and such devices are encompassed by the term laptop computer in the discussions below unless noted otherwise.

In various embodiments, the MDU bearing a differential GPS (DGPS) unit begins positioning sensor units as close as possible to the suggested placements as indicated by the laptop computer based upon DGPS locations of sensor units in the initial placement map. The actual placements of the sensor units may be at locations different from the initially suggested locations since natural vegetation or other obstacles may make the placement at the originally selected locations undesirable or even impossible. As the MDU positions a sensor unit, the DGPS location of the unit is communicated to the base unit. After positioning the sensor unit, the MDU moves around in the vicinity of the sensor unit performing a potentially detectable activity. One example of such an activity is stepping on the ground; the footsteps may be detectable with seismic and/or acoustic sensors The DGPS location of the MDU activity is communicated to the base unit. When the MDU is at a location within the detection zone of the sensor unit, the sensor unit detects the activity of the MDU. The location of the MDU and the signal from the sensor device are time-correlated to identify the location of detection events; this information is used to generate the measured detection zone of the sensor unit that will be incorporated into the detection map. The sensor network can use such detections to update the probabilities of detection at various locations in the detection map and to determine the vulnerabilities of the network. The detection map can be configured to represent the probability of detection for a constant false alarm rate, for a detection threshold, or for some other detection criterion in accordance with the decision of the user. Gaps in the detection map indicate vulnerabilities. The MDU can adjust the position of sensor units to reduce or remove undesired gaps by placing new sensor units or by or moving previously placed sensor units. In some locations, it may be difficult or impossible for the MDU to move around the sensor unit performing the detectable activity in such a manner as to fully map out the detection zone. In that case, a portion of the detection zone may be defined by the operator rather than measured directly. This is still termed a measured detection zone.

As each sensor unit is placed and its detection zone is added to the detection map, the measured detection zone replaces a corresponding expected detection zone in the detection map. The base unit may communicated with the MDU to tell it whether the most recently placed sensor unit needs to be repositioned because its detection zone does not adequately overlap the adjacent detection zone to exceed the CPD along the detection perimeter. The base unit may also recalculate the placement sites for as-yet unplaced sensors to improve the overlap of their detection zones that can affect the effectiveness of the detection perimeter.

Figure 2:
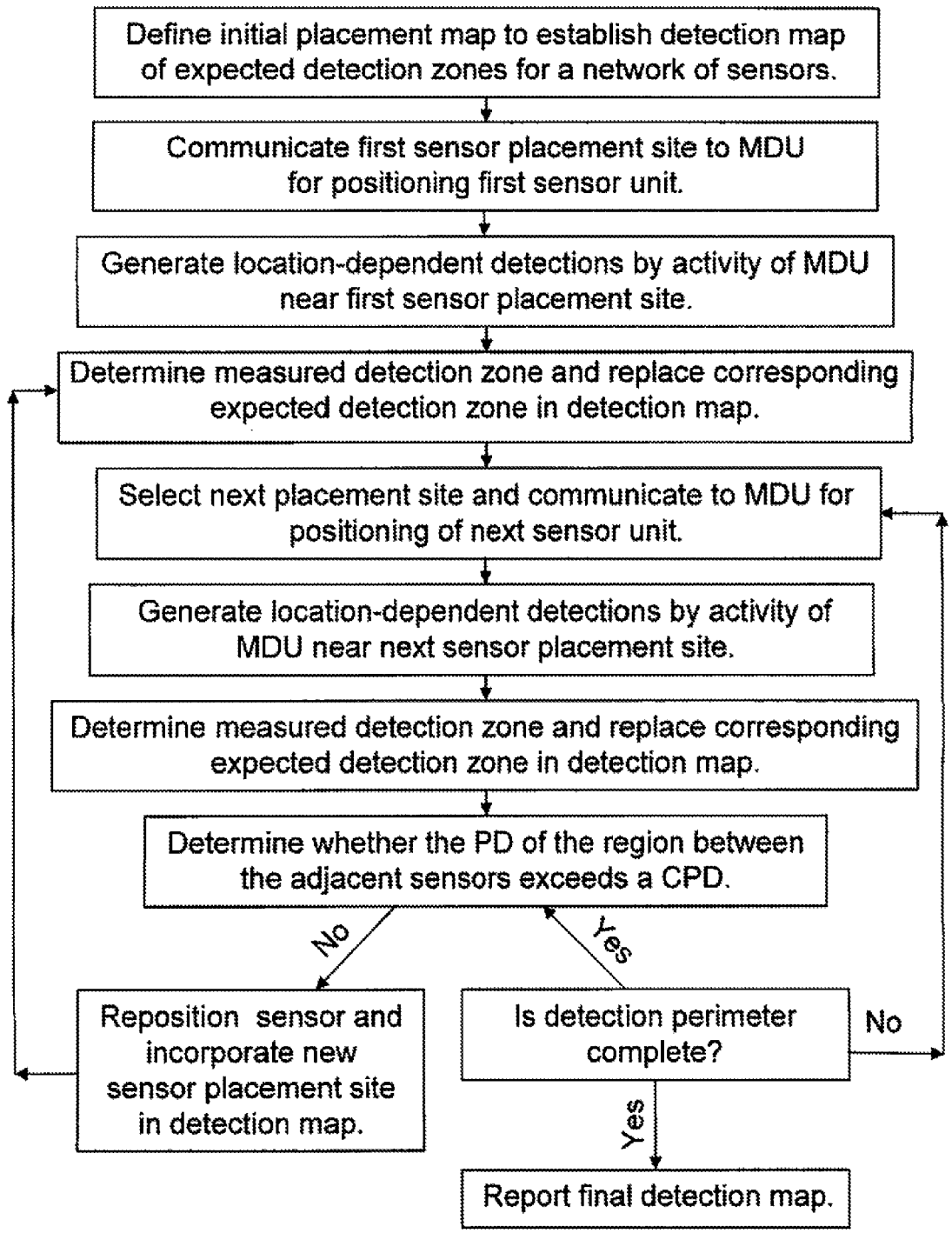
FIG. 2 presents an outline of one embodiment of the real-time method for establishing a detection map for a network of sensors.

The process of establishing the detection map corresponding to a detection perimeter of a network of sensors is illustrated for one embodiment in FIG. 2.

In one embodiment, as illustrated schematically in FIGS. 3a-3d, a user defines an initial perimeter 10 on a digital map around the area to be defended by a detection perimeter. A set of initial placement sites 12 (small open circles in FIGS. 3a-3d) for sensor units that should form an effective detection perimeter approximately corresponding to the defined initial perimeter 10 are calculated and communicated to a mobile deployment unit (MDU). In some embodiments, the initial placement sites can lie on the initial perimeter line 10 or they can be located near the initial perimeter line 10 but offset somewhat from the initial perimeter consistent with providing sufficient detection sensitivity at the initial perimeter line. The latter case is illustrated in FIG. 3a, where the expected detection zones of adjacent initial placement sites intersect proximate to the initial perimeter 10. FIG. 3a illustrates a set of initial placement sites 12 that would be expected to form an effective detection perimeter if each sensor unit could detect activity within its expected detection zone, delimited by the dashed lines 13 that is approximately centered on each initial sensor unit placement site. For nonisotropic sensors, such as directional or semidirectional sensors, the circular expected detections zones 13 of FIG. 3a would be replaced by a set of appropriate anisotropic detection zones with the initial placement sites selected to produce continuity of detection between adjacent expected detection zones.

FIG. 3b illustrates some possible effects of terrain on the actual detection perimeter that the Initial placements of FIG. 3a would produce. The solid lines around the initial placement sites represent possible examples of actual detection zones assuming the sensor units are positioned at the initial placement sites 12. Occupied placement sites are indicated by filled circles. Distortions of the actual detection zones of various sensor units can be produced by terrain features. The distortion can be relatively small, as for detection zone 14 where some terrain characteristic has reduced the detection zone somewhat but has left a high degree of symmetry of the actual detection zone 14 around the initial placement site. In some cases, such as for detection zone 15, larger deviations including reduction in detection range and reduction of symmetry of the detection zone 15 around the initial placement site. Either situation can leave pronounced gaps 16 in regions between adjacent detection zones. In some cases, a terrain feature may interrupt the overlap of adjacent detection zones. For example, some terrain feature 17 such as a deep trench or a water feature may prevent adjacent detection zones 18 and 19 from overlapping. FIG. 3c illustrates one way in which some of the sensor units can be relocated from initial placement sites 12 that did not permit establishment of an effective perimeter to actual placement sites 20-24 that illustrate three conditions related to repositioning sensor units. Other conditions may pertain that can have improved perimeters following sensor unit repositioning. In some cases, such as for actual placement site 20, repositioning the single sensor unit produces good detection zone overlap with the adjacent expected detection zones. In some cases, such as for actual placement site 21, while repositioning only a single sensor unit to shift the location of detection zone 14 could achieve acceptable detection zone overlap, it may be more desirable to position two sensor adjacent sensor units at actual sensor sites 21 and 22. Comparison of the detection maps for the two configurations may provide guidance on which approach is to be preferred to achieve a better detection perimeter for a given application. In some cases, significantly greater shifts in sensor unit positions may be required; the presence of a strongly interfering terrain feature, such as 17, may necessitate large shifts in one or more sensor unit positions sites from their initial placement sites 12 to actual placement sites 23 and 24 that lead to closure of detection gaps to form an effective detection perimeter that may be substantially shifted from the initial perimeter. Another configuration of actual detection sites for establishing a detection perimeter is presented in FIG. 3d. In this case, more actual sensor sites (25, 26, and 27) are shifted from their corresponding initial placement sites, but the established detection perimeter is larger. It is possible in embodiments of this method to determine while the sensor network is being established what sensor unit positions are more likely to produce a detection perimeter that more closely approximates the originally desired perimeter. In some embodiments, the operator can try several possibilities by adjusting the location of unoccupied sites in the detection map and calculating the effect to provide guidance for choosing among alternative sets of sensor unit sites in the process of setting up the network.

The detection map for each of the sensor unit configurations in FIGS. 3b-3d is the combination of the detection zones indicated by the solid lines around the actual placement sites. It is to be noted that one combination of placement sites that form an effective detection perimeter by their overlapping detection zones are not the only combination of sites that will form a continuous effective perimeter. Thus, the ability to incorporated a measured detection zone as the actual detection zone into a detection map that is being developed while the sensor network is being deployed allows the repositioning of sensors that provide inadequate detection zones. It also enables the comparison of the detection maps of alternative network configurations to allow the operator/user to select one more suited to a particular application. Such dynamic configuration of the network provides confidence that a genuinely effective detection perimeter has been established by the deployed system of sensor units.

Figure 4:
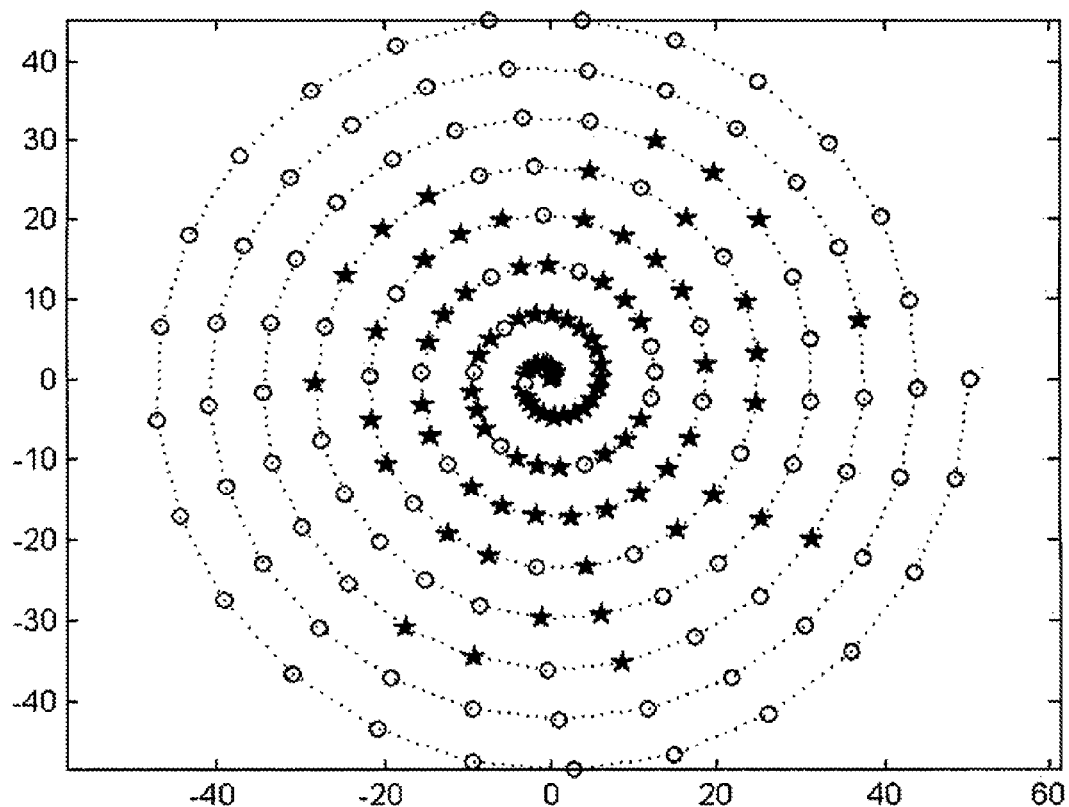
FIG. 4 illustrates detections by a sensor unit around which an MDU is walking in a spiral. Stars indicate detections and open circles represent nondetections.

The steps whereby the MDU performs the detectable activity will depend on the particular activity and the sensor modality being employed. The following illustration is an embodiment where the footsteps of the MDU are to be detected by a seismic sensor or an acoustic sensor. Each type of sensor can generate a modality detection zone for its particular sensing modality. These modality detection zones can be used individually or in combination to generate a detection zone for a particular sensor unit. Each modality detection map identifies locations where the modality minimum probability of detection (MMPD) is equaled or exceeded. In some embodiments, it is sufficient to exceed only one of the minimum modality MMPD for a location to be considered to lie within the detection zone; in some embodiments, it may be desirable to require meeting the MMPD for more than one sensing modality for the location to be considered within the detection zone. FIG. 4 illustrates a map of detected activity of the MDU where the MDU has walked in a spiral around a sensor unit located at the center of the spiral. Stars indicate locations where the sensor unit detected the activity of the MDU and open circles indicate nondetection locations. In various embodiments, the MDU can travel around the site of the sensor unit in a wide variety of patterns; the spiral path illustrated her was selected solely for the convenience of illustration.

For each sensor unit, one can estimate a sensor probability of detection function (SPDF). This function describes the probability of detection as a function of position relative to the sensor. In some embodiments, for simplicity, one can assume homogeneous geography and soil conditions which give an isotropic sensor response. In such a case, the PD varies only with range to the sensor. In some embodiments, a nonisotropic SPDF may be employed. For given sensor unit, the SPDF can be estimated by the expected detection sensitivity of the particular sensor unit. This can be modified by real sensor behavior as the MDU traverses a pattern around the sensor unit's placement site. The MDU can measure all or part of detection sensitivity, depending on access and/or desire to sample points around a sensor placement site. When appropriate as determined by the operator/user, asymmetric detection zones and detection zones containing discontinuities may be incorporated into the detection map for a particular sensor unit.

Figure 5:
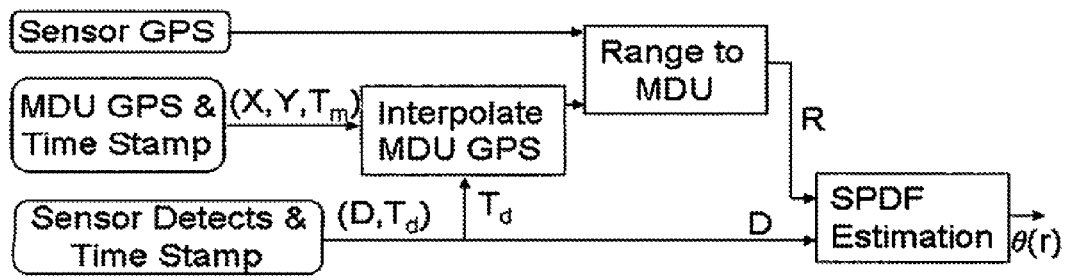
FIG. 5 presents a block diagram illustrating an approach for estimating a sensor probability detection function (SPDF).

FIG. 5 shows a block diagram illustrating an approach for estimating an SPDF for some embodiments. The MDU GPS produces location information (X,Y) in lat/long along with a timestamp $T_m$. The sensor detections $D=\{d_1 \ldots d_n\}$ are recorded as 0/1 along with the time of detection $T_d$. The first step in the process is to interpolate the MDU detections to match the time of the sensor detections. After aligning the MDU position and sensor unit detections in time we can estimate the range of the MDU to the sensor unit. Thus the SPDF estimator uses a sequence of ranges $R=\{r_1 \ldots r_n\}$ of the MDU from the sensor unit and a list of 0/1 detections $D=\{d_1 \ldots d_n\}$ from a footstep algorithm. The result is the SPDF $\theta(r)$, where r represents the ranges of interest.

Maximum likelihood SPDF estimation: From the number of detections s(r) at range r and the number of nondetections u(r) we can compute the probability of detection $\theta(r)$ as follows:

$$\theta(r) = \frac{s(r)}{s(r)+u(r)}. \quad (1)$$

Here the numerator represents the number of detection successes and the denominator represents the number of trials. One method for estimating s(r) and u(r) is to use a histogram approach. Thus we can partition the range of interest into m bins and count the number of detections in each bin to get $\hat{s}(r)$:

$$\hat{s}(r) = \sum_{i=1}^{n} I(c(r)-r_i;h)d_i, \quad (2)$$

where I(z,h) is an indicator function on the interval [−h,h] and c(r) is a function that gives the bin center closest to r. Similarly, we can get $\hat{u}(r)$:

$$\hat{u}(r) = \sum_{i=1}^{n} I(c(r)-r_i;h)(1-d_i). \quad (3)$$

Using $$\hat{\theta}(r) = \frac{\hat{s}(r)}{\hat{s}(r)+\hat{u}(r)} \quad (4)$$

gives a maximum likelihood estimate of the probability of detection for range r.

Parzen kernel SPDF estimation: To get a smooth estimate, one can use the Parzen kernel approach (E. Parzen, "On estimation of probability density function and mode," Annals of Mathematical and center these smooth functions over every observation. The estimates for Statistics, 33:1065-1076, 1962). In such case, one uses a kernel function rather than a box as the basic building blocks $\hat{s}(r)$ and $\hat{u}(r)$ become $$\hat{s}(r) = \sum_{i=1}^{n} w(r-r_i;h_s(n))d_i, \quad (5)$$

and $$\hat{u}(r) = \sum_{i=1}^{n} w(r-r_i;h_u(n))(1-d_i), \quad (6)$$

where w(z;h) is a kernel function with an integral of one and bandwidth h. For the kernel estimate to converge to the actual function, we require $$\lim_{n\to\infty} h(n) = 0 \text{ and } \lim_{n\to\infty} nh(n) = \infty \quad (7)$$

A common choice for the kernel function is a Gaussian $$w(z;h) = \frac{1}{h\sqrt{2\pi}} e^{-z^2/2h^2}, \quad (8)$$

and for the bandwidth $$h(n)=bn^{-\gamma}, 0<\gamma<1 \quad (9)$$

It has been shown that $\gamma=1/5$ produces the best approximation in the sense of mean integrate squared error (MISE). Selection of the parameter b is more difficult, since we need to know the form of the function we are approximating. A conservative approach assumes the function is Gaussian and minimizing the MISE gives $b=\sigma(4/3)^{1/5}$ where σ represents the standard deviation of the range data. A robust estimate for σ that accommodates outliers is given by the following median absolute deviation estimator:

$$\tilde{\sigma}=\text{median}\{[R-\tilde{\mu}_R]\}/0.6745, \quad (10)$$

where $\tilde{\mu}_R$ represents the median of the samples in R. Note that we use a different b for $h_s$ and $h_u$.

Figure 6:
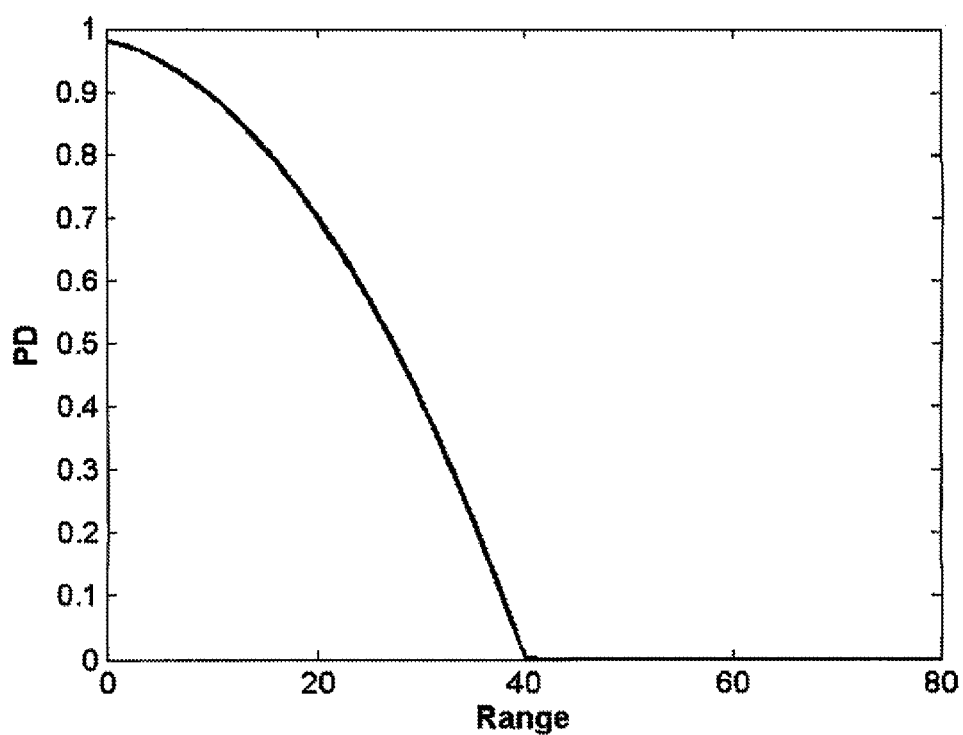
FIG. 6 illustrates an example SPDF.
Figure 7:
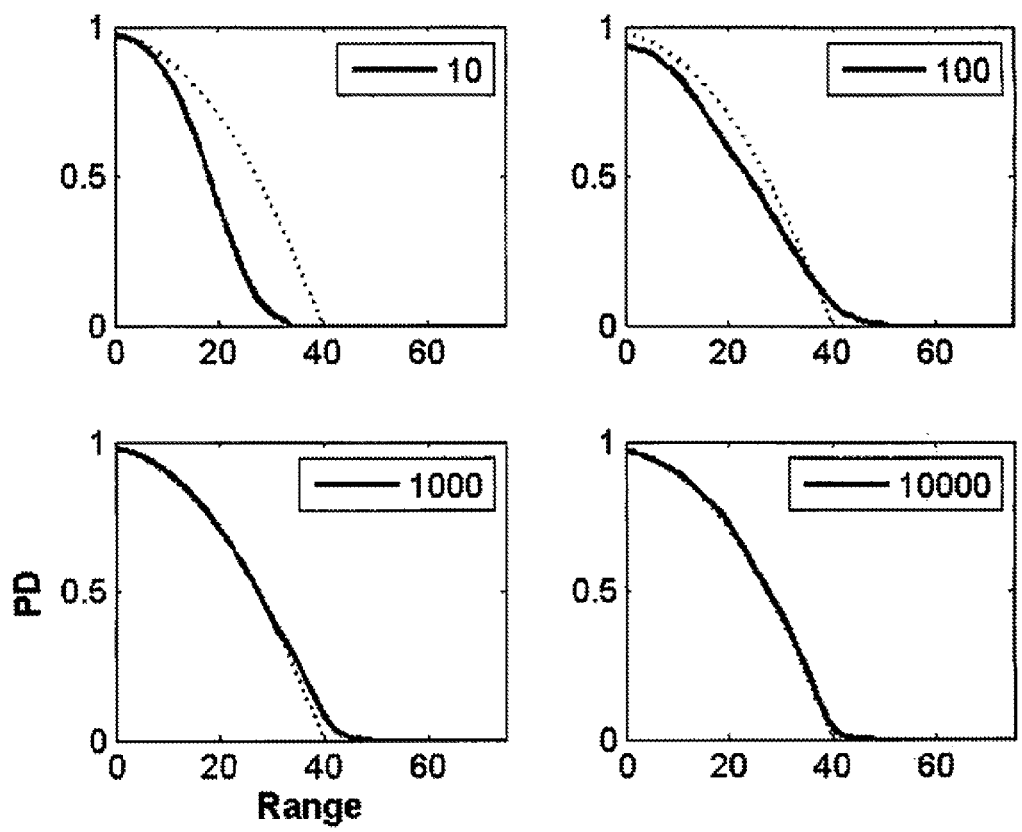
FIG. 7 shows different example SPDF's estimated using a Parzen kernel.

Parzen kernel results: FIG. 4 presents a simulation of an MDU walking in a spiral around a sensor unit. The detections and nondetections are generated using the SPDF shown in FIG. 6 and are represented as stars and circles, respectively. FIG. 7 shows the results of using Parzen kernels to estimate the SPDF. The dotted line in each graph represents the true SPDF. The legend indicates the total number of detections and nondetections or number of trials along the spiral path that were used to estimate an SPDF. As the number of trials increase the Parzen estimator converges closer and closer to the true SPDF. Note the sharp discontinuity at the max range of 40 is difficult for the Parzen estimator to approximate.

Bayesian SPDF estimation: To incorporate prior knowledge about the SPDF, one can use a Bayesian estimation approach. To simplify notation we will implicitly assume that θ, s, and u are a function of r. Recall that s represents the number of "successes" and the number of "tries" is represented by s+u. The conditional probability function for s given the probability of detection θ is a binomial distribution:

$$f(s \mid \theta) = \binom{s+u}{s} \theta^s (1-\theta)^u. \tag{11}$$

Here we hold θ fixed and examine the probability distribution of s over its possible values.

To use Bayes' theorem, we need a prior distribution g(θ) that gives our belief about the possible values of the parameter θ before gathering any data. The posterior distribution is proportional to the prior times the likelihood:

$$g(\theta \mid d) \propto g(\theta) f(s \mid \theta) \tag{12}$$

The conjugate prior for the binomial is the beta(a,b) density function:

$$g(\theta) = \frac{\Gamma(a+b)}{\Gamma(a)\Gamma(b)} \theta^{a-1} (1-\theta)^{b-1}. \tag{13}$$

where a and b are the shape parameters. The resulting posterior for our problem is:

$$g(\theta \mid d) = c\theta^{s+a-1}(1-\theta)^{u+b-1} \tag{14}$$

where $$c = \int_0^1 g(\theta(r)) f(s \mid \theta) d\theta \tag{15}$$
$$= \frac{\Gamma(s+u+a+b)}{\Gamma(s+a)\Gamma(u+b)}.$$

The posterior is a beta distribution with shape parameters $$a' = s+a \text{ and } b' = u+b. \tag{16}$$

The Bayes' solution is the mean of the conditional distribution of posterior for θ:

$$\tilde{\theta} = \frac{a+s}{a+b+s+u}. \tag{17}$$

The Bayes' solution can be rewritten as:

$$\tilde{\theta} = \left(\frac{s+u}{a+b+s+u}\right) \frac{s}{s+u} + \left(\frac{a+b}{a+b+s+u}\right) \frac{a}{a+b}. \tag{18}$$

Using (1) and making the dependence on r explicit:

$$\tilde{\theta}(r) = (1-\alpha(r))\hat{\theta}(r) + \alpha(r)\overline{\theta}(r), \tag{19}$$

where $$\alpha(r) = \frac{a(r)+b(r)}{a(r)+b(r)+s(r)+u(r)}, \tag{20}$$

and $$\overline{\theta}(r) = \frac{a(r)}{a(r)+b(r)}. \tag{21}$$

For range r, $\overline{\theta}(r)$ is the mean of prior and the parameter α(r) represents a weighting factor with a value between 0 and 1. Thus the Bayes' estimate $\tilde{\theta}(r)$ is a weighted average of the maximum likelihood $\hat{\theta}(r)$ (estimated using the Parzen kernel approach) and the mean of the prior distribution $\overline{\theta}$. If a=b=0 then all the weight is placed on the maximum likelihood estimate $\hat{\theta}(r)$. If s(r)+u(r)=0 then there are no tries at range r and all the weight is placed on the mean of the prior distribution $\overline{\theta}(r)$. The sum M=a(r)+b(r) represents the weight of the prior evidence and is a user supplied parameter.

Figure 8:
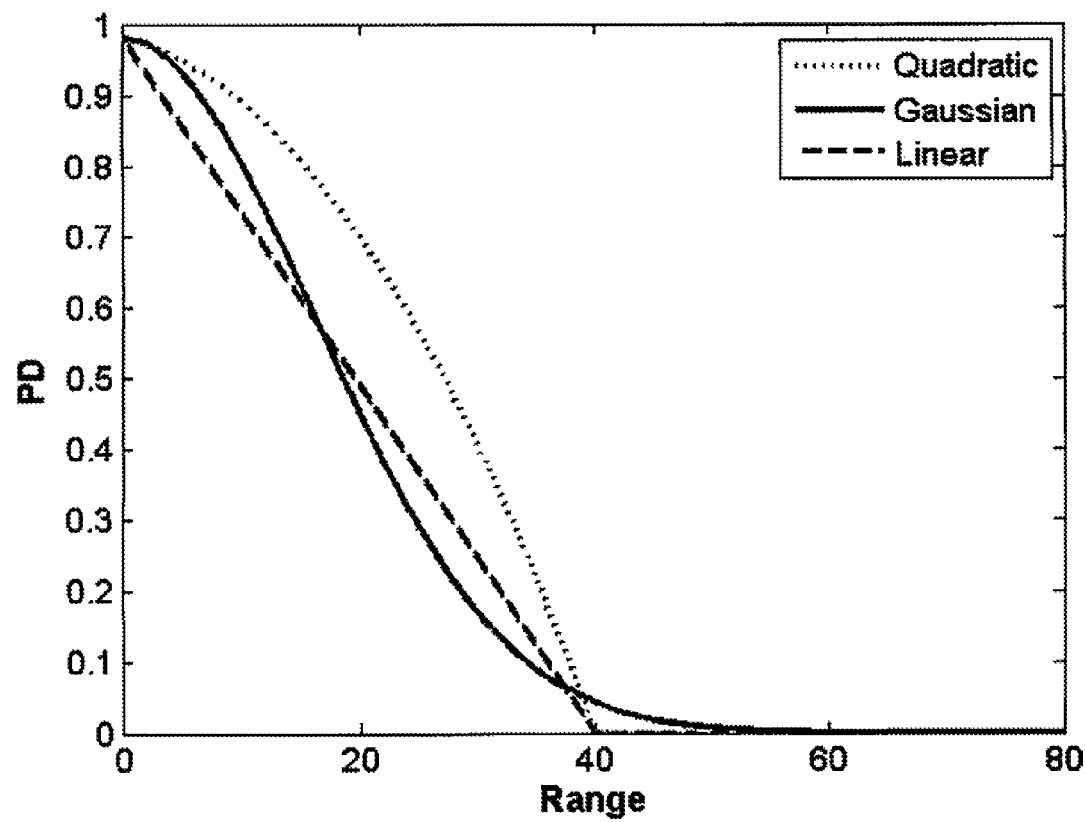
FIG. 8 presents example prior SPDF's.

SPDF Bayesian prior: The prior SPDF determines the mean of the prior. It represents our belief of the SPDF before collecting any data. FIG. 8 shows different examples of possible prior SPDF's. The three things they have in common are:
1) A maximum PD at a range of zero,
2) The PD decreases as the range increases, and
3) The maximum range of the sensor pod.

From the prior SPDF $\overline{\theta}(r)$ and the weight of the prior M we can determine the shape parameters a(r) and b(r). From $\overline{\theta}(r) = a(r)/[a(r)+b(r)]$ and M=a(r)+b(r) we get:

$$a(r) = M\overline{\theta}(r) \text{ and } b(r) = M-a(r). \tag{22}$$

SPDF Bayesian confidence interval: The posterior distribution g(θ|d) is beta(a',b') where the shape parameters are given by (16). An equal tail area 95% confidence interval $[\theta_l, \theta_u]$ for θ can be found by selecting $\theta_l$ at the $2.5^{th}$ percentile and selecting $\theta_u$ at the $97.5^{th}$ percentile. The difference $\Delta\theta = \theta_u - \theta_l$ represents the uncertainty of the estimate. By collecting enough samples to make Δθ small allows us to control the credibility of the estimate.

Figure 9:
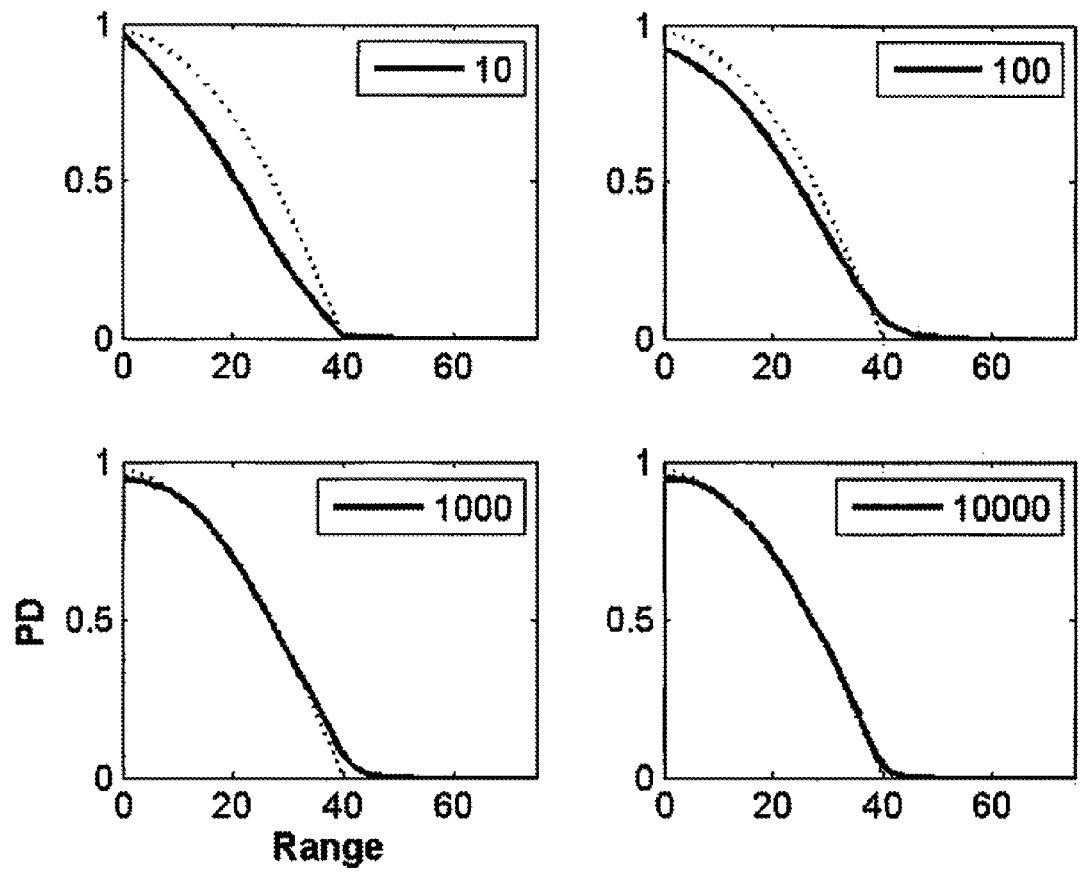
FIG. 9 presents Baysian results using a Bayes' SPDF estimator and a linear prior SPDF for M=2.

SPDF Bayesian Results: FIG. 9 shows results using a Bayes' SPDF estimator and a linear prior SPDF for M=2. The legend shows the total number of trials that were used to estimate the SPDF. For a small number of trials most of the weight is on the prior linear SPDF. As the number of trials increase the collected data takes over and the SPDF starts converging to the true SPDF.

Recursive SPDF estimation: We would like to estimate a detection map as we get positions and detections from the MDU. Thus after receiving a buffer of observations, we want to throw the observations away and not have to store them in memory. Unfortunately, we need to know the number of detections in order to set the Parzen bandwidth parameter h.

An alternative is to use an estimator where h changes as the number of samples increase. The following estimator has been shown to converge for reasonable kernels and as long as the properties in (7) ((7) are met:

$$f_n^*(r) = \sum_{i=1}^{n} w(r - r_i; h(i)). \quad (23)$$

This can be rewritten recursively as $$f_n^*(r) = f_{n-1}^*(r) + w(r - r_n; h(n)). \quad (24)$$

Thus the maximum likelihood estimate after n observations becomes:

$$\theta_n^*(r) = \frac{s_n^*(r)}{s_n^*(r) + u_n^*(r)}. \quad (25)$$

where $$s_n^*(r) = s_{n-1}^*(r) + w(r - r_n; h_s(n)) d_n. \quad (26)$$

and $$u_n^*(r) = u_{n-1}^*(r) + w(r - r_n; h_u(n))(1 - d_n) \quad (27)$$

Figure 10:
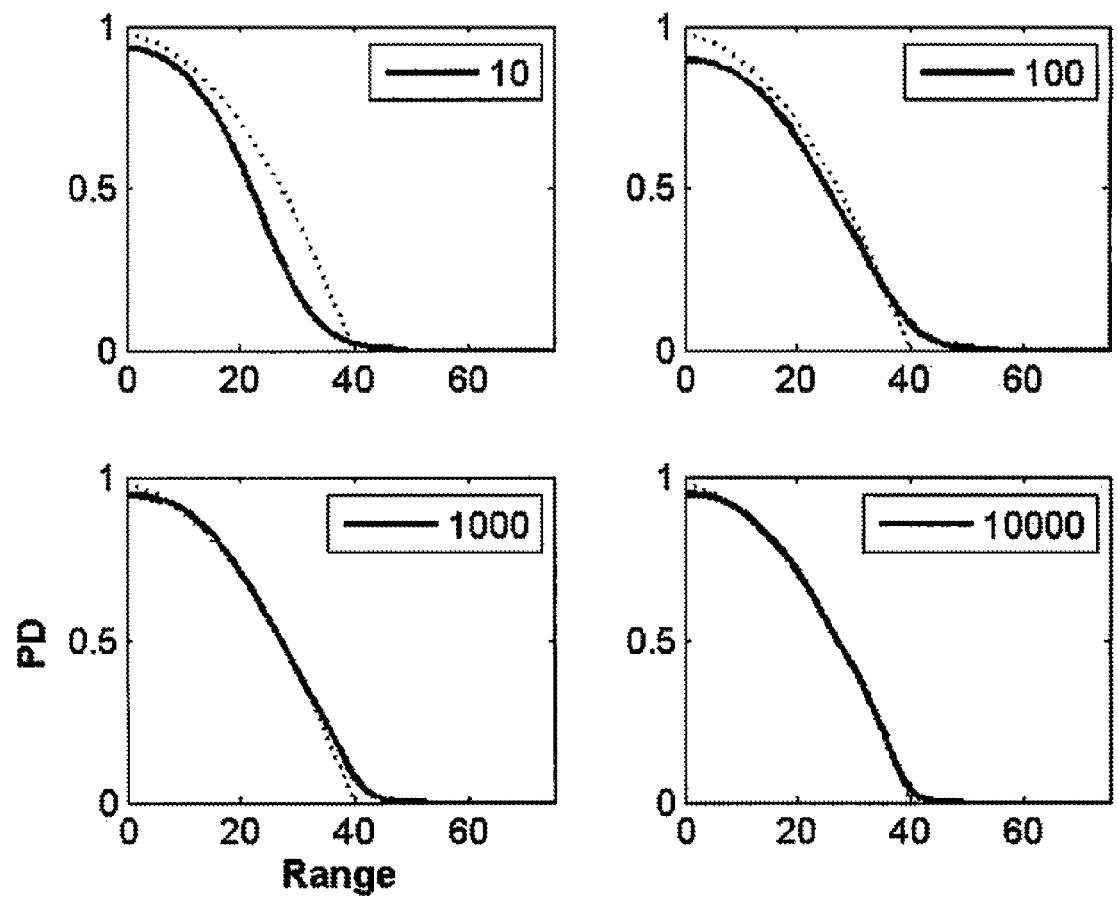
FIG. 10 presents the results of estimating an SPDF using the recursive Parzen approach. The legend indicates the total number of trials.

FIG. 10 shows the results of estimating an SPDF using the recursive Parzen approach. The legend indicates the total number of trials. Results are similar to the standard Parzen's approach with a fixed bandwidth parameter.

Estimating a network of sensors PD map: The detection map is represented as a 2D image array with each pixel mapping to area on the ground and containing an estimate of the PD for the sensor network. We assume that the network reports a detection if any of the sensor units has a detection. Let $\theta^*_p(r)$ represent the current SPDF for pod p at ranger. Let $(x_p, y_p)$ be the position of each pod and $(x_i, y_i)$ be the center position of the $i^{th}$ pixel of interest. We assume all positions are in some common world coordinate system. Let $\delta_p(i)$ represent the distance of $i^{th}$ pixel $(x_i, y_i)$ to all the sensor unit positions $(x_p, y_p)$. The probability that at least one pod detects a footstep is one minus the probability that they all don't detect a footstep. Thus the probability of detection at pixel $(x_i, y_i)$ is:

$$\pi_i = 1 - \prod_{j=1}^{P} [1 - \theta_j^*(\delta_j(i))], \quad (28)$$

where p denotes the total number of pods in operation. By computing π, for every pixel in the detection map image we can get a detection map for the area of interest.

Processing the sensor data: To access the sensor data, the map client subscribes to specific data and message streams. Table 1 shows the four messages we are interested in. From these messages we can use the Bayes framework to update the SPDF and calculate a new estimated PD map.

TABLE 1

Sensor message types and their description.

| Message Type | Description |
|---|---|
| 1002 | MDU or sensor unit initialized |
| 1010 | Footstep start detection (high state) |
| 1011 | Footstep stop detection (low state) |
| 1018 | MDU GPS reading |

Figure 11:
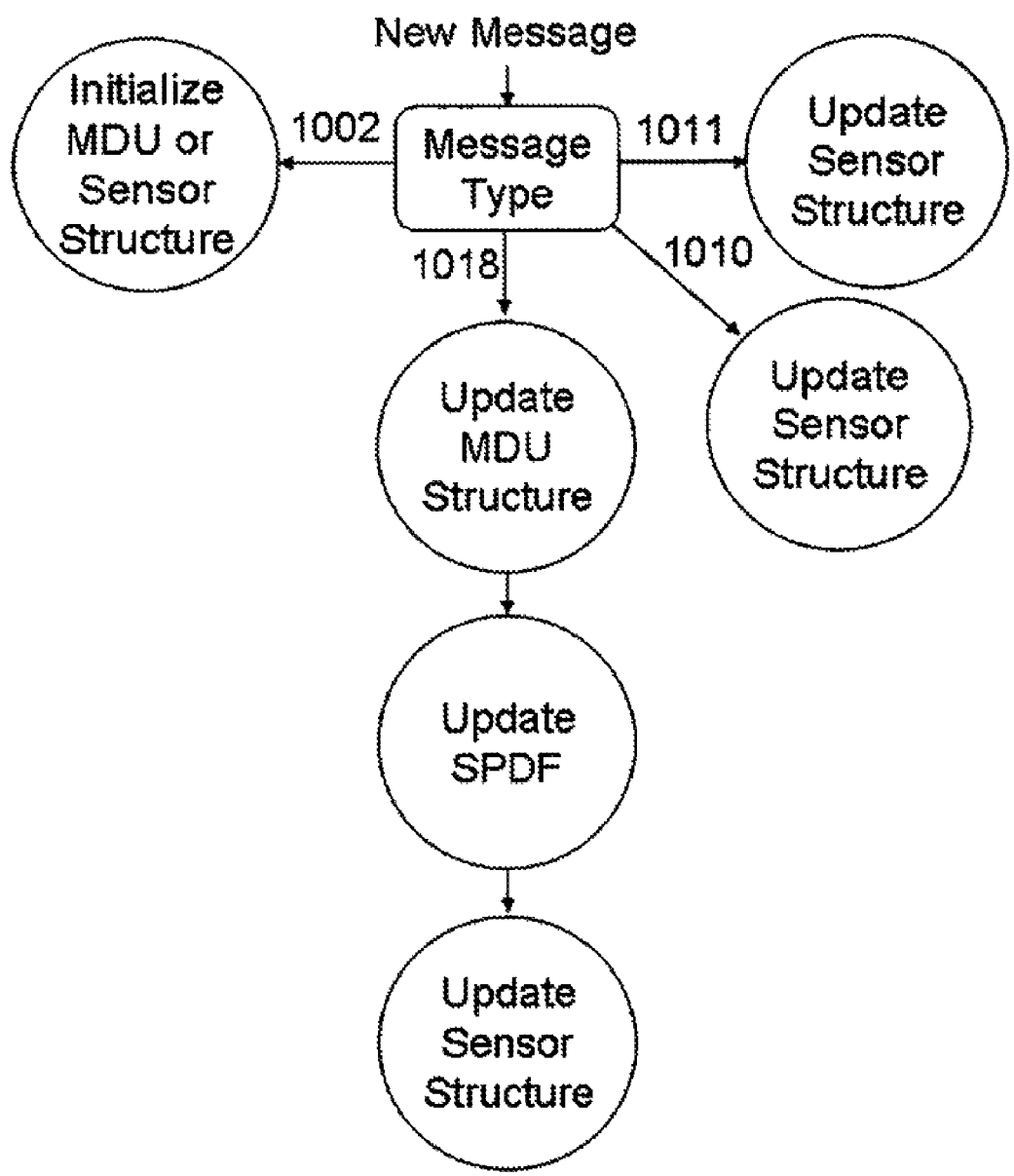
FIG. 11 presents a flowchart of one embodiment for processing sensor data and message streams.

FIG. 11 shows the processing of the sensor data. For a message type of 1002, the map client initializes a data structure for an MDU or sensor pod. The footstep detections are run length encoded, so only a footstep high state (detection) or low state (nondetection) is sent. Initially we assume no footstep detections. Anytime we get 1010 or 1011 we add the appropriate state and time stamp to the sensor data structure. A 1018 indicates a new MDU GPS location. Once we get two MDU locations with their respective time stamps, we can start interpolating to find MDU locations between the two time stamps. The 1018 message drives the update of the SPDF. This also triggers an update of the current footstep decision states and time stamps of all sensor data structures. Table 1 and FIG. 11 describe one framework for processing sensor data based upon occasional MDU GNSS measurements and interpolation of the location of the detected activity; other embodiments can use other methods of the location of a detectable activity and the detection data.

Figure 12:
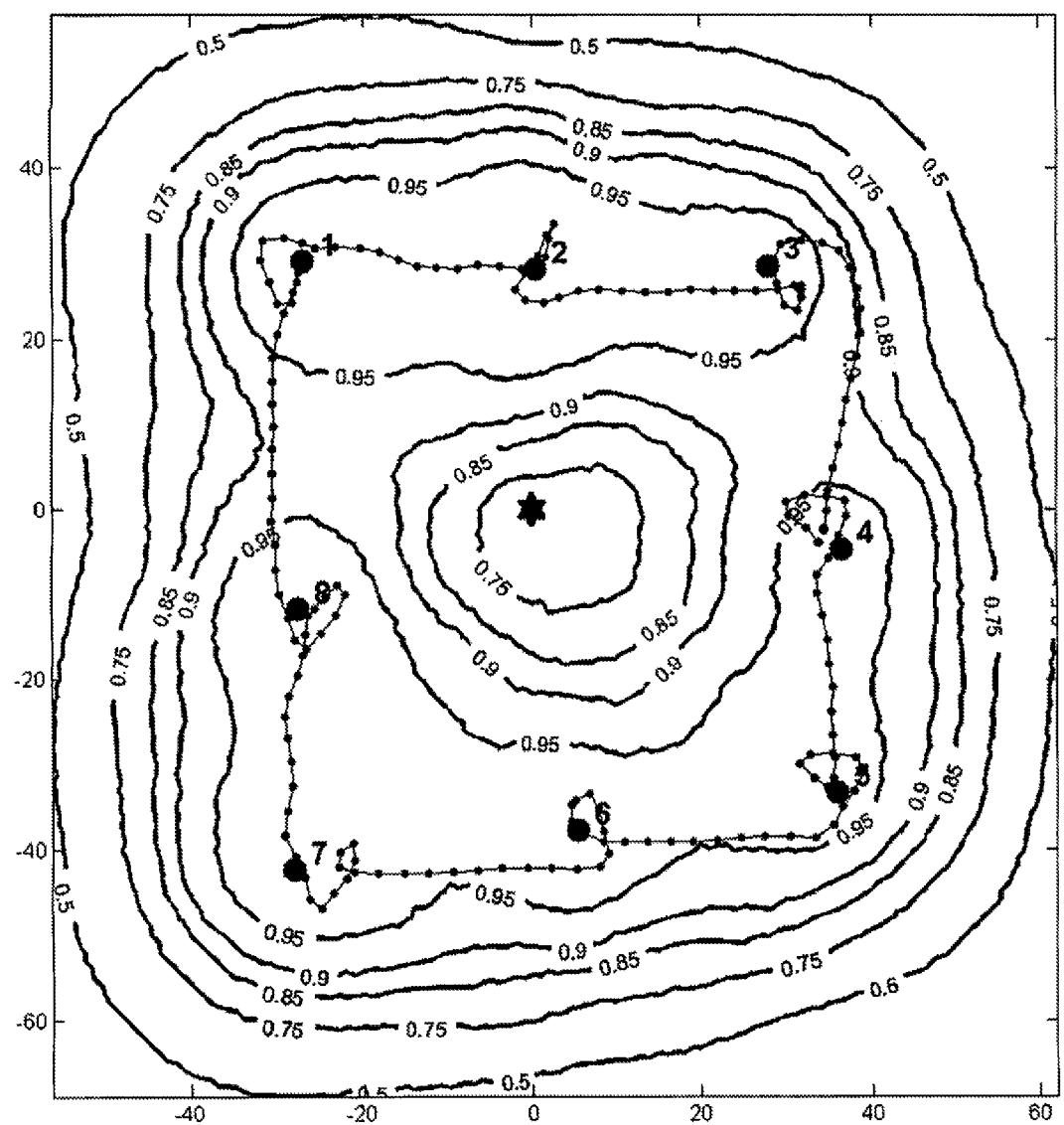
FIG. 12 presents a detection map for an 8-unit sensor network displaying contour lines for various probability-of-detection values.

FIG. 12 shows a detection map that was derived while testing the algorithms using a network that has eight sensor units defining a rectangular area on level terrain. Four sensor units are in the corners of the rectangle and the remaining four sensor units are in the middle of the sides of the rectangle. An MDU walked around visiting each sensor unit as if he were setting up the network. Using the location of the sensor units and the generated SPDF's one obtained the contour map in FIG. 12 The filled circles show the location of the sensor units, and the star shows the location of a high value asset that is located within the detection perimeter established by the sensor network. The line with the dot markers shows the path walked by the MDU. The contour lines represent the PD of a footstep detector for the entire network. The contour lines represent the mean of Bayes' estimate of PD. From the detection map we can see two gaps for a PD of 0.95, but the 0.90 PD line forms a virtual perimeter.

In some embodiments, the detection probabilities of the detection map can be plotted as contours. Such a plot can be similar in appearance to an elevation contour map wherein the contour lines represent probabilities of detections instead of elevations. The required detection probability for the system is called the critical probability of detection (CPD). Any gaps in the CPD contour indicate vulnerabilities in the virtual perimeter. Such a PD contour map is illustrated in FIG. 12.

Figure 13:
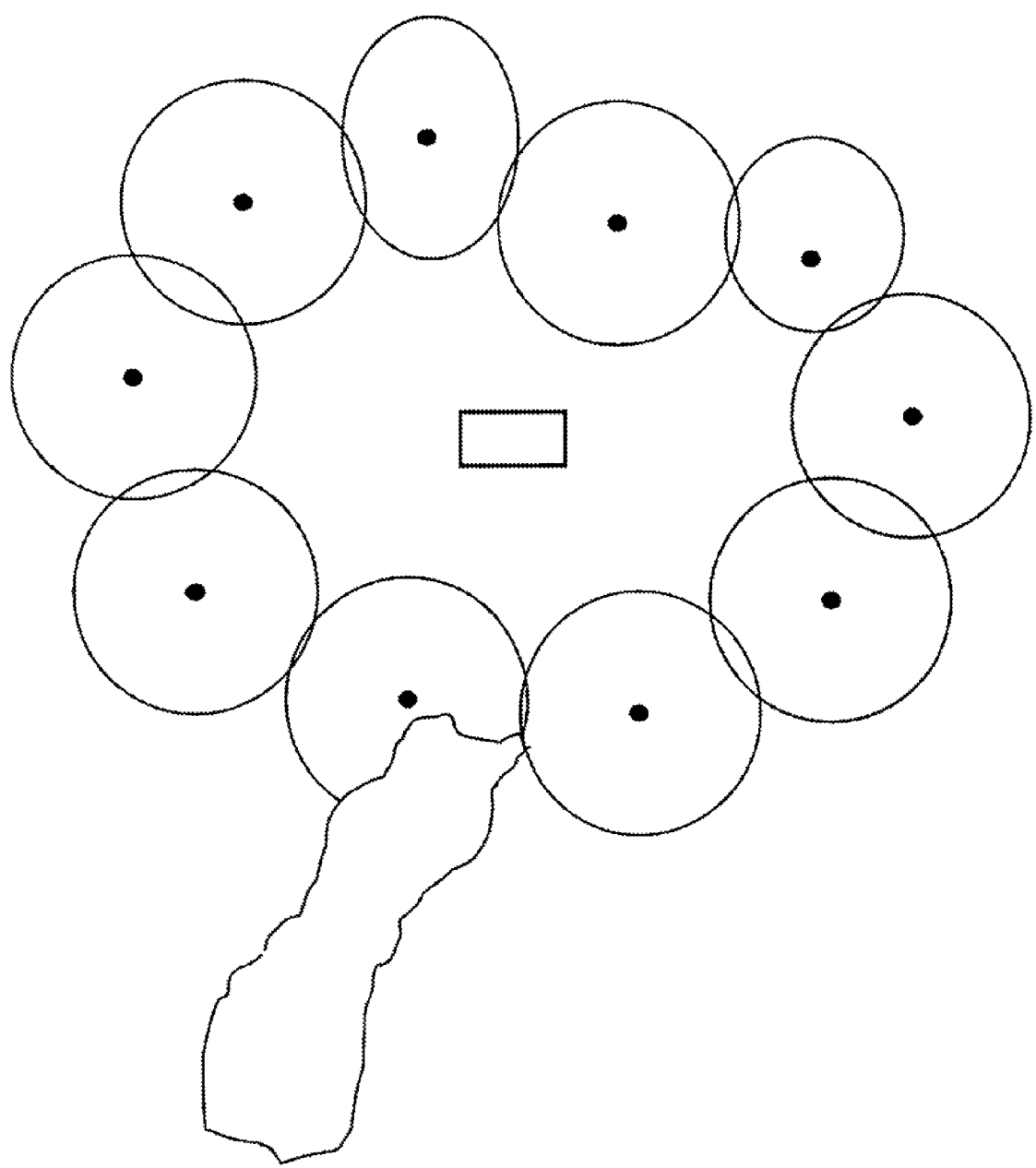
FIG. 13 presents a detection map for a 10-unit network displaying the detection zones for each sensor unit that combine to form the detection perimeter.

In some embodiments the combination of the detection zones for the sensor units can be plotted as a display of the detection map. FIG. 13 is an example corresponding to the sensor unit network of FIG. 1. Graphical smoothing techniques can also be employed to produce a display of the approximate detection area.

In some embodiments, a sensor unit may include more than one sensor devices with different sensing modalities. For example, a sensor unit intended to detect footsteps or other sounds indicating motion of a person or vehicle might comprise both acoustic and seismic sensors devices. A detection map can be constructed for either of the sensor modalities individually or one that reflects the combined detection of the sensors. In some embodiments, detection may be considered to have occurred only if both sensor devices detect the activity of the MDU during network set-up. In some embodiments, detection may be considered to have occurred if only one of the sensor devices detects the activity. The shape of the measured detection zones for different sensor modalities may be quite different; an example would be a sensor unit comprising both a directional optical sensor and an isotropic seismic sensor. In some embodiments employing directional sensors such as optical sensors, the directionally dependent signal generated by the sensor is communicated to the base unit for determination of the effective field of view. For example, the presence of an object that blocks the optical path or a particular sensor will produce a reduction in the lateral extent of the detection zone in the direction of the object for that sensor.

In some embodiments, the detection zones of an established network may be remeasured to determine whether the detection perimeter is still operating as expected; sensor units can be repositioned if their performance has changed, resulting in a change in their measured detection zones and the corresponding detection map, or if something in the terrain has changed so that their presumed detection zone no longer corresponds with what their measured detection zone would be. In such cases, a new detection map is established for the sensor network. In such embodiments, the MDU traverses the areas proximate to the individual sensor units, performing an activity that can be detected by the sensor unit to generate a current set of measured detection zones. As in the initial establishment of the reconfigurable sensor network, the measured detection zones replace the presumed detection zones in the detection map. When appropriate, a sensor unit may be relocated to improve the overlap of the measured detection zones to re-establish an effective detection perimeter. Embodiments of this invention involving remeasurement of detection zones and reconfiguration of the placement sites of the sensor units when appropriate can generate an updated detection map that can be employed as desired or as needed to maintain an effective detection perimeter.

The approaches described above for determining detection zones and constructing the detection map interactively during construction of the sensor network by the MDU are readily adaptable to combinations of sensor modalities in a given sensor unit. In some embodiments, the detection map that is generated can represent a fusion or combination of the detection maps from multiple different types of sensors.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for establishing a detection map of a dynamically configurable sensor network, the method comprising:
  defining an initial perimeter;
  deriving from the initial perimeter an initial placement map for a plurality of sensor units, the initial placement map comprising a plurality of initial placement sites for sensor units, wherein each sensor unit has an expected detection zone around the sensor unit's initial placement site and wherein a combination of the expected detection zones forms a detection map corresponding to a detection perimeter;
  positioning a first sensor unit using a mobile deployment unit equipped with a location-identification means at a first actual placement site proximate to a first initial placement site and incorporating a location of the first sensor unit into the detection map;
  determining a first measured detection zone of the first sensor unit at least in part by detecting an activity of the mobile deployment unit;
  modifying the detection map by replacing in the detection map the expected detection zone of the first sensor unit with the first measured detection zone;
  positioning a second sensor unit using the mobile deployment unit at a second actual placement site proximate to an adjacent initial placement site and incorporating a location of the second sensor unit into the detection map;
  determining a second measured detection zone of the second sensor unit at least in part by detecting the activity of the mobile deployment unit;
  replacing a second expected detection zone of the second sensor unit with the second measured detection zone in the detection map;
  determining whether a region of the detection map corresponding to a region between the first and second sensor units provides a minimum probability of detection within the region between the first and second sensor units;
  if the minimum probability of detection is not provided, repositioning the second sensor unit using the mobile deployment unit, redetermining the second measured detection zone of the second sensor unit at least in part by detecting the activity of the mobile deployment unit to obtain a replacement second measured detection zone, replacing the second measured detection zone with the replacement second measured detection zone in the detection map, and determining whether the region of the detection map corresponding to the region between the first and second sensor units provides a minimum probability of detection within the region between the first and second sensor units;
  if the minimum probability of detection is provided, positioning a third sensor unit using the mobile deployment unit at a third actual placement site proximate to a next adjacent initial placement site, determining a third measured detection zone of the third sensor unit at least in part by detecting the activity of the mobile deployment unit, and replacing a third expected detection zone with the third measured detection zone in the detection map; and
  repeating the steps of positioning sensor units, determining measured detection zones, replacing expected detection zones with measured detection zones in the detection map, determining provision of the minimum probability of detection between adjacent sensor units, and optionally repositioning sensor units until the detection map comprising measured detection zones of the detection perimeter of the dynamically configurable sensor network has been established.

2. The method of claim 1, wherein detecting an activity of the mobile deployment unit using the first sensor unit comprises:
  obtaining sensor data from the first sensor unit at a measurement time;
  determining whether the sensor data indicates a detection of the activity of the mobile deployment unit by the first sensor unit;
  determining a signal-generating location of the mobile deployment unit at the measurement time; and
  incorporating the signal-generating location into the detection map as part of the first measured detection zone.

3. The method of claim 1, further comprising:
  determining a location for the actual placement site of the sensor unit using the location-identification means of the mobile deployment unit or using a location-identification means associated with the sensor unit; and communicating the location of the actual placement site to a base unit for incorporation into the detection map.

4. The method of claim 3, further comprising:
determining whether the actual placement site is an acceptable placement site and instructing the MDU to reposition the sensor unit if the actual placement site is not one of the acceptable placement sites.

5. The method of claim 3, wherein the location-identification means employs a method of retrieving GNSS data or a pulsed triangulation method.

6. The method of claim 3, wherein the base unit comprises a computer, a means for establishing communication with the sensor unit, and optionally a location-identification means.

7. The method of claim 6, wherein the base unit is co-located with the mobile deployment unit.

8. The method of claim 6, wherein the base unit performs at least one of the steps of:
determining a location of the initial placement site wherein the location is proximate to the detection perimeter;
determining whether the actual placement site is one of the acceptable placement sites;
analyzing a combination of actual placement sites and unoccupied initial placement sites to determine if the detection perimeter will encompass a desired region and directing relocation of at least one of a site selected from the actual placement sites and an unoccupied initial placement site if the detection perimeter does not encompass the desired region; and
determining whether an overlap of adjacent measured detection zones provides the minimum probability of detection at a corresponding portion of the detection perimeter.

9. The method of claim 1, wherein the mobile deployment unit is a living being or a robotic device.

10. The method of claim 1, wherein the location-identification means is a differential GPS unit.

11. The method of claim 1, further comprising:
deriving a modified placement map comprising actual placement sites and unoccupied initial placement sites, wherein at least one of the unoccupied initial placement sites is moved to produce a combination of detection zones that provides a better probability of detection along at least part of the detection perimeter, and
replacing the initial placement map with the modified placement map for guiding placement of sensor units.

12. The method of claim 1, further comprising combining measured detection zones of at least two proximate sensor units to form a combined detection zone for including in the detection map for determining whether a region of the detection map provides the minimum probability of detection.

13. The method of claim 1, wherein the sensor unit comprises at least two sensing modalities and further comprising:
determining a modality detection zone for each sensing modality; and
determining the measured detection zone of the sensor unit by combining the modality detection zones.

14. The method of claim 13, wherein providing the minimum probability of detection is provided by exceeding a modality minimum probability of detection for the at least two sensing modalities.

15. The method of claim 1, wherein the sensor unit comprises at least one sensor selected from the group consisting of a seismic sensor, an acoustic sensor, an optical sensor, a chemical sensor, and a radiation sensor.

16. The method of claim 1, wherein the detection perimeter is discontinuous.

17. The method of claim 1, wherein the expected detection zone corresponds to a region around the initial placement site where a value of a sensor probability of detection function equals or exceeds an initial minimum probability of detection.

18. The method of claim 1, wherein the step of determining each measured detection zone is performed by a corresponding sensor unit.

19. The method of claim 1, wherein the measured detection zone is at least partially measured and partially calculated using a sensor probability of detection function.

20. A method for establishing a detection map of a dynamically configurable sensor network, the method comprising:
determining a first measured detection zone of a first sensor unit of a sensor network at least in part by detecting an activity of a mobile deployment unit equipped with a location-identification means, wherein the sensor network comprises a plurality of sensor units that form a detection perimeter by combining a plurality of detection zones, wherein each sensor unit has a sensor placement site and a presumed detection zone, wherein a combination of the presumed detection zones forms a detection map;
modifying the detection map by replacing in the detection map the presumed detection zone of the first sensor unit with the first measured detection zone;
determining a second measured detection zone of a second sensor unit proximate to the first sensor unit at least in part by detecting the activity of the mobile deployment unit;
replacing the presumed detection zone of the second sensor unit with the second measured detection zone in the detection map;
determining whether a region of the detection map corresponding to the region between the first and second sensor units provides a minimum probability of detection within the region between the first and second sensor units;
if the minimum probability of detection is not provided, repositioning the second sensor unit to a replacement second sensor placement site using the mobile deployment unit, redetermining the second measured detection zone of the second sensor unit at least in part by detecting the activity of the mobile deployment unit to obtain a replacement second measured detection zone, replacing the second measured detection zone with the replacement second measured detection zone in the detection map, and determining whether the region of the detection map corresponding to the region between the first and second sensor units provides the minimum probability of detection within the region between the first and second sensor units;
if the minimum probability of detection is provided, determining a third measured detection zone of a third sensor unit at least in part by detecting the activity of the mobile deployment unit, and replacing a third presumed detection zone of the third sensor unit with the third measured detection zone in the detection map; and
repeating the steps of determining measured detection zones, replacing corresponding presumed detection zones with measured detection zones in the detection map, determining provision of the minimum probability of detection between adjacent sensor units, and optionally repositioning sensor units until the detection map comprising measured detection zones of the sensor network has been established.

* * * * *